310-11 SR

FIP8502 OR 3,895,243

United States Patent [19] [11] 3,895,243

Amend et al. [45] July 15, 1975

[54] METHOD AND MEANS OF GENERATING POWER FROM FOSSIL FUELS WITH A COMBINED PLASMA AND LIQUID-METAL MHD CYCLE

[75] Inventors: William E. Amend, Hinsdale; John C. Cutting, Downers Grove, both of Ill.

[73] Assignee: The United States Energy Research and Development Administration, Washington, D.C.

[22] Filed: Mar. 12, 1974

[21] Appl. No.: 450,519

[52] U.S. Cl. .......... 310/11; 60/39.18 B; 60/39.18 R
[51] Int. Cl.[2] .......... G21D 7/02
[58] Field of Search ....... 60/655, 671, 673, 39.18 R; 310/11

[56] References Cited

UNITED STATES PATENTS

| | | | |
|---|---|---|---|
| 3,414,744 | 12/1968 | Petrick | 310/11 |
| 3,508,090 | 4/1970 | Crampton et al. | 310/11 |
| 3,636,389 | 1/1972 | Petrick | 310/11 |
| 3,720,850 | 3/1973 | Way | 310/11 |

*Primary Examiner*—Martin P. Schwadron
*Assistant Examiner*—H. Burks, Sr.
*Attorney, Agent, or Firm*—Dean E. Carlson; Arthur A. Churm; Donald P. Reynolds

[57] ABSTRACT

The heat required for operation of a two-phase liquid-metal MHD generator is obtained from the waste heat of a plasma MHD generator. The liquid metal is heated by passing it in heat exchange relationship to the combustion mixture exhausted from the plasma MHD generator and the inert gas is heated by cooling the walls of the combustion chamber and plasma MHD generator.

2 Claims, 1 Drawing Figure

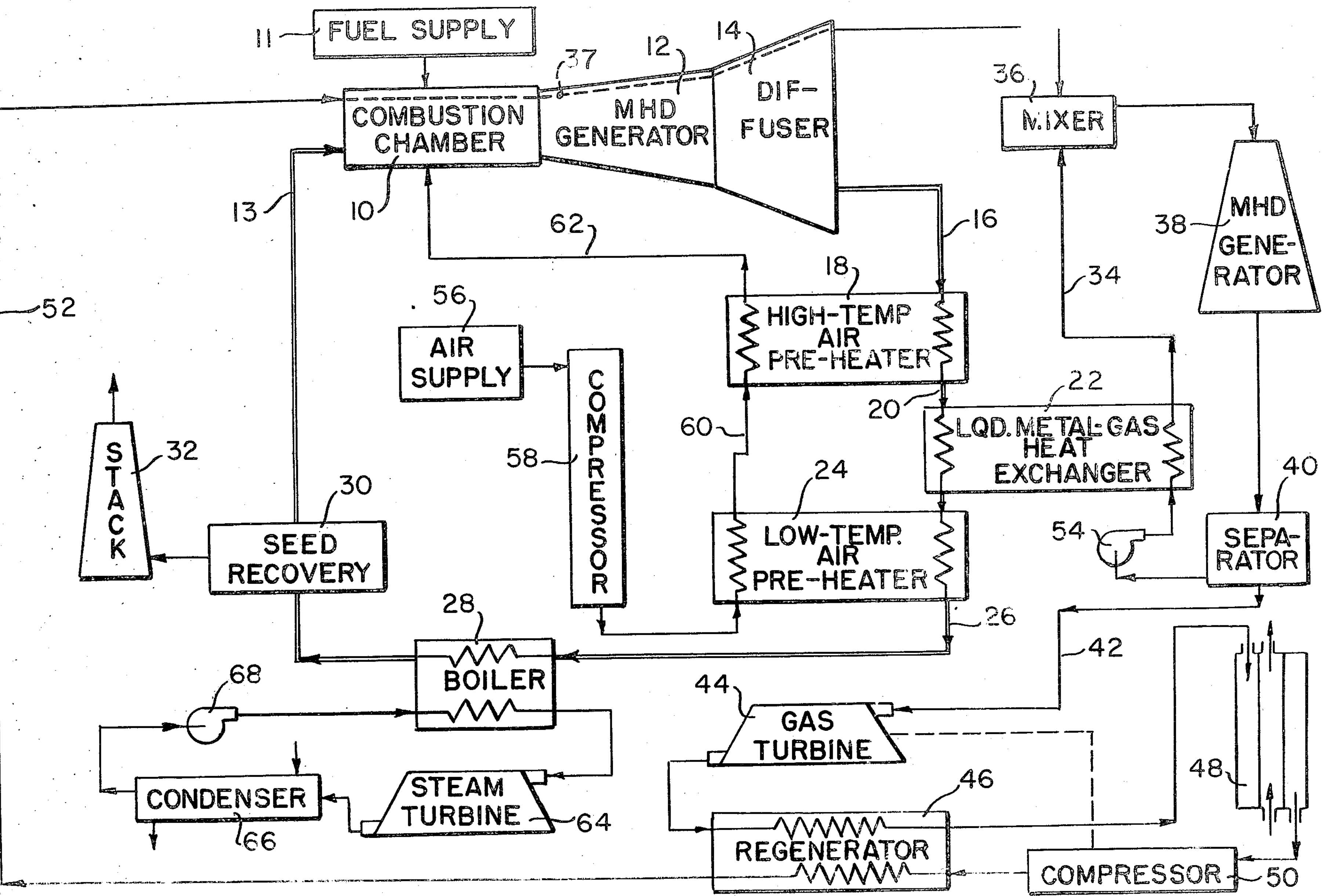
FUEL SUPPLY
11
COMBUSTION CHAMBER
10
13
37
MHD GENERATOR
12
DIF-FUSER
14
MIXER
36
MHD GENE-RATOR
38
16
62
18
HIGH-TEMP AIR PRE-HEATER
34
52
56
AIR SUPPLY
COMPRESSOR
58
20
LQD. METAL-GAS HEAT EXCHANGER
22
60
STACK
32
SEED RECOVERY
30
LOW-TEMP. AIR PRE-HEATER
24
54
SEPA-RATOR
40
28
26
BOILER
42
68
44
GAS TURBINE
48
STEAM TURBINE
64
CONDENSER
66
46
REGENERATOR
COMPRESSOR
50

METHOD AND MEANS OF GENERATING POWER FROM FOSSIL FUELS WITH A COMBINED PLASMA AND LIQUID-METAL MHD CYCLE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to an improved method and means of converting the energy of fossil fuel to electrical and mechanical energy through a magnetohydrodynamic (MHD) generator. More specifically, the invention relates to an over-all cycle representing a combination of a plasma-MHD topping cycle, fired by fossil fuel, with a two-phase liquid-metal-and-gas MHD bottoming cycle. Efficiency of the over-all cycle is improved by recovering energy of the gas in a turbine and by recovering energy from waste heat in a conventional thermal power plant.

It is well known that single-stage plasma MHD systems as presently understood do not provide sufficiently high recovery of energy from a working fluid to make them competitive with conventional steam systems. Various systems have been proposed to combine such systems with other systems operating at relatively low temperatures to accomplish energy conversion at competitive over-all efficiencies. The use of the plasma-MHD system is desirable because it operates at temperatures that present the opportunity to achieve high thermodynamic efficiency. Such temperatures are not now usable in conventional thermal power systems due to material limitations.

The combination of a plasma-MHD topping cycle with a conventional steam power plant has been proposed as a means of obtaining increased efficiency. This has, however, the disadvantage that present-day steam power plants are operable at inlet temperatures only up to the order of 1,000°F. (800°K.). A plasma-MHD system typically rejects materials at temperatures of the order of 3000°F. (19000°K.). There is thus a temperature gap between the two systems that must be filled by some form of energy conversion system if the over-all efficiency of such a system is not to suffer.

One way to eliminate the temperature gap is to reduce the high temperature. This is undesirable because it sacrifices the Carnot efficiency theoretically available in association with the high temperature. It is preferable to use the working fluid as hot as possible. The alternative is to keep the high temperature and fill the gap.

It is an object of the present invention to fill the temperature gap between usable plasma-MHD systems and steam power plants.

It is an object of the present invention to provide a better cycle for conversion of the energy of fossil fuel by combining a plasma-MHD topping cycle with a liquid-metal-and-gas bottoming cycle.

It is an object of the present invention to provide an improved cycle for converting the energy of fossil fuel to electrical energy or mechanical energy or both.

Other objects will become apparent in the course of a detailed description of the invention.

SUMMARY OF THE INVENTION

The present invention combines two MHD cycles into a single over-all operating cycle. The first of the two cycles is a plasma-MHD topping cycle that burns fossil fuel and generates electricity through an MHD generator. This system is coupled to a liquid-metal-gas system in two ways. An inert gas such as helium is heated in the process of cooling the walls of a combustion region for the fossil fuel and also the MHD generator. A liquid metal such as lithium is heated in a heat exchanger that has as a heat source the combustion products of the topping cycle. The heated liquid metal and the heated gas are combined and applied to a second MHD generator which also generates electrical energy. Efficiency of the cycle is increased by using the heated inert gas to drive a gas turbine and by using the waste heat of combustion to operate a conventional thermal power plant.

BRIEF DESCRIPTION OF THE DRAWING

The drawing is a functional block diagram of a liquid-metal and plasma MHD system according to the principles of the present invention.

DETAILED DESCRIPTION OF THE INVENTION

Referring to the figure, combustion chamber 10 is connected to fuel supply 11 to receive a supply of a fossil fuel such as natural gas, oil or coal. The fossil fuel is mixed with preheated air in combustion chamber 10 and is burned. The products of combustion are supplied to MHD generator 12 as a plasma for MHD conversion to generate electrical energy. A conducting seed that is a compound of potassium or cesium is injected into combustion chamber 10 from seed supply 13 in order to assure sufficient electrical conductivity of the products of combustion in MHD generator 12. Possible choices for such compounds include carbonates, hydroxides, and sulfates of potassium and cesium. After expansion in the MHD generator, the products of combustion including the seed are carried to diffuser 14 where they are restored to a pressure slightly above atmospheric pressure. The combustion products then proceed through pipe 16 to high-temperature air preheater 18 to heat combustion air. Combustion products next proceed through pipe 20 to liquid-metal-gas heat exchanger 22 where heat is removed to heat a liquid metal. The combustion products then continue to a low-temperature air preheater 24 which extracts still more heat from the combustion products to preheat air for inserrtion into insertion chamber 10. From low-temperature air preheater 24 the combustion products proceed through pipe 26 to boiler 28 to extract heater for a conventional thermal cycle. From boiler 28 the combustion products proceed to ash-handling and seed recovery means 30 where the conducting seed is recovered for recycling into combustion chamber 10 and the ash, if any, is removed before the remaining combustion products are exhausted through stack 32. The system just described, beginning with fossil fuel in combustion chamber 10 and ending at stack 32, comprises a fossil fuel fired open cycle plasma MHD system.

A second cycle begins in liquid-metal-gas heat exchanger 22 in which a liquid metal is heated with the combustion products existing from diffuser 14 through high-temperature air preheater 18. The heated liquid metal is conducted through pipe 34 to mixer 36. A heat exchanger 37 comprises conducting tubes placed in thermal contact with the combustion products in the walls of combustion chamber 10, MHD generator 12 and diffuser 14 to cool the walls. An inert gas such as helium is heated in heat exchanger 37 and is mixed in mixer 36 with the liquid metal from liquid-metal-gas heat exchanger 22. The mixture is transported to second MHD generator 38 where electrical energy is extracted therefrom. Following second MHD generator 38 the mixture of inert gas and liquid metal proceeds to separator 40 where the inert gas and liquid metal are separated. The separated inert gas proceeds through pipe 42 to gas turbine 44 which extracts mechanical energy from the thermal energy of the inert gas. The spend inert gas proceeds to regenerator 46 which extracts heat therefrom, thence to reject heat exchanger 48 before it enters compressor 50 and regenerator 46. It is convenient, although not necessary, to drive compressor 50 with gas turbine 44. The compressed inert gas leaving compressor 50 and preheated in regenerator 46 proceeds through pipe 52 to heat exchanger 37 where its cycle continues. The liquid metal from separator 40 is circulated by pump 54 to liquid-metal-gas heat exchanger 22, completing its cycle.

Air for combustion of the fossil fuel is received from air supply 56 to air compressor 58 where it is compressed before entering low-temperature air preheater 24. Here the compressed air receives some energy from the combustion products that have left diffuser 14. The partly heated air proceeds through pipe 60 to high-temperature air preheater 18 in which the air receives still more heat from the combustion products leaving diffuser 14. Pipe 62 then conducts the preheated and pressurized air to combustion chamber 10 to support the combustion reaction therein.

The working fluid heated in boiler 28 is delivered to turbine 64 for the recovery of mechanical energy therefrom. Spent working fluid proceeds to condenser 66 where it is condensed to a liquid. Feed pump 68 then pumps the working fluid to an appropriate pressure for recirculation through boiler 28. The working fluid may be water or any other conventional working fluid such as mercury vapor, Dowtherm A, or Dowtherm E, for use in the cycle just described, which is a waste-heat recovery cycle. This is shown as a closed cycle, but it is evident that this cycle could equally as well be open.

The combination cycle described above comprises four basic systems. These are: (1) a plasma MHD topping cycle burning fossil fuel; (2) a two-phase liquid-metal MHD bottoming cycle using a liquid metal and an inert gas in a mixture as the working fluid for MHD conversion; (3) a heat-transfer system comprising the interface between the two MHD cycles in which the liquid metal and the gas used in the bottoming cycle receive heat from the topping cycle; (4) a waste heat cycle using a conventional boiler and turbine for further recovery of heat from the system. Most of the waste heat from the plasma topping cycle is transferred to the liquid-metal bottoming cycle in a liquid-metal-gas heat exchanger. However, a significant portion, of the order of 15%, of the heat input to the liquid-metal MHD system is derived from cooling the walls of the combustion chamber and the associated MHD generator by circulating therein the gaseous working fluid of the liquid-metal cycle.

Energy is supplied to the system by injecting a fossil fuel into the combustion chamber for burning. Calculations reported herein have been performed using natural gas as a fuel, mixed with stoichiometric amounts of preheated air and a seed of potassium carbonate comprising 0.5% of potassium by weight. The combuation chamber can equally as well be designed for operation on other fuels such as oil or pulverized coal. Pulverized coal has a particular advantage in seed recovery in that most of the seed can be expected to be trapped in the ash resulting from combustion and may be removed therefrom more readily than from stack gases. In any event, the fossil fuel that is used is a matter of choice by availability and is not a critical factor in the cycle.

Considering the two-phase liquid-metal MHD bottoming cycle, the hot liquid metal from the liquid-metal-gas heat exchanger is mixed with the inert gas in the mixer to form a homogeneous two-phase mixture that supplies the working fluid for the second MHD generator. Expansion of the two-phase mixture in the second MHD generator results in energy extraction by expanding the mixture to a low pressure with a relatively small temperature drop. Following separation of the two phases, inert gas and liquid metal, the inert gas has a relatively high energy content which is recovered in part by expanding the heated gas through a gas turbine. The waste heat recovery cycle described herein is a conventional steam Rankine cycle saturated vapor at the turbine inlet. The all-MHD power cycle has an extra advantage in that the bottoming cycle is a Brayton cycle. This offers the environmental advantage of enabling the use of dry cooling towers for removal of waste heat from the cycle without incurring excessive cooling costs.

EXAMPLE

The basic cycle disclosed herein has been analyzed mathematically using the following parameters.

1. Plasma cycle a. Combustion chamber:

Thermal input to combustion chamber: 2000 NW
Fuel: Natural gas
Oxidizer: Air in stoichiometric proportions
Air preheat temperature: 2780°F.
Thermal losses in combustion chamber and nozzle: 100 MW
Seed: Potassium carbonate in an amount equal to 0.5% K by weight
Pressure: 6 atm
Pressure drop in combustion chamber: 5%
Isentropic efficient of outlet nozzle from combustion chamber: 95%
Exit Mach number: 0.75 b. MHD Generator

Type: Cross-connected, single load
Magnetic field: Uniform at 5 Tesla
Wall temperature: 1800°K.
Cross connection angle: 45°
Maximum Hall field: 2700 volts/meter
Electrode voltage drop: 0 volts c. Air Compressor Over-all compression ratio: 6.4
Number of compression stages: 2
Inlet temperature: 45°F. (280°K.)
Isentropic efficiency: 89% d. Diffuser

Exit pressure: 1.1 atm
Isentropic efficiency: 90%
Exit velocity: 50 m/sec Percentage pressure drop in air preheater: 3% Parameters used to calculate the liquid-metal bottoming cycle were the following:

a. Mixer
- Liquid metal: Lithium
- Gas: Helium
- Pressure loss: 10 psi
- Exit pressure: 1140 psia b. Generator
- Aspect ratio: 15
- Load voltage: 10 volts
- Entrance void fraction: 0.75
- Exit void fraction: 0.85
- Efficiency of liquid-metal pump: 85%
- Pressure loss in liquid-metal-gas heat exchanger: 10 psi
- Isentropic efficiency of gas turbine: 90%
- Regenerator effectiveness: 0.90
- Regenerator pressure loss: 10 psi/pass
- Reject heat exchanger effectiveness: 0.90
- Reject heat exchanger pressure loss: 10 psi
- Gas compressor isentropic effiency: 90%
- Gas compressor stages: 5

Parameters for the heat recovery cycle are as follows:
- Working fluid: Water
- Cycle: Rankine
- Boiler pressure: 1000 psia
- Steam conditions: Saturated vapor at 545°F. (558°K.)
- Condenser pressure: 1.6 psia
- Turbine isentropic efficiency: 80%
- Calculated efficiency of steam cycle: 29% (taken as constant)

Under the assumptions and parameters stated above, a maximum efficiency was calculated as 55.4%, a figure significantly higher than the over-all conversion efficiency of the plasma MHD steam cycle taken alone.

The combined cycle operates at a maximum efficiency that is approximately 6% higher than the highest efficiency achievable with a plasma MHD-steam system operating under comparable conditions, and this improvement is achieved with mixing temperatures that are presently attainable. The result is a calculated saving of more than 11% in waste heat per unit of power generated. An added advantage of the combined cycle results from operation of the liquid-metal-and-gas MHD system on a Brayton cycle. This facilitates use of dry cooling towers for dispersal of waste heat without the significant economic penalty inherent in operating evaporative cooling towers.

The embodiments of the invention in which an exclusive property or privilege is claimed are defined as follows:

1. A method of converting the chemical energy of fossil fuel to electrical energy comprising burning the fossil fuel in a combustion chamber to form a gaseous combustion product, adding an electrically conducting seed material, passing the seeded combustion product through a first MHD generator electrical energy, heating a liquid metal by heat exchange with said combustion product, passing an inert gas in heat-exchange contact with said combustion products in said combustion chamber and in said first MHD generator to heat said inert gas and cool the walls of said combustion chamber and first MHD generator, mixing the heated inert gas and liquid metal to form a heated mixture, passing the heated mixture through a second MHD generator to generate electrical energy, separating the heated mixture into spent liquid metal and spent inert gas, and recycling said spent liquid metal and spent inert gas through the aforementioned heat exchange and mixing steps to the second MHD generator.

2. A method of converting chemical energy of fossil fuel to electrical and mechanical energy comprising:
- mixing the fossil fuel with preheated air and a conducting seed of potassium carbonate to form a combustion mixture;
- burning the combustion mixture in a combustion chamber;
- passing the burned combustion mixture through a first MHD generator to generate electrical energy;
- cooling the combustion chamber and the first MHD generator by heat-exchange contact with an inert gas;
- passing the burned combustion mixture through a diffuser to restore the mixture approximately to atmospheric pressure, leaving a spent combustion mixture;
- exchanging heat from the spent combustion mixture with air for combustion in a high-temperature air preheater;
- passing the spent combustion mixture leaving the high-temperature air preheater through a liquid metal-gas heat exchanger;
- exchanging heat from the spent combustion mixture with air for combustion in a low-temperature air preheater;
- passing the spent combustion mixture leaving the low-temperature air preheater through a boiler to heat a working fluid;
- recovering the conducting seed from the spent combustion mixture;
- exhausting the spent combustion mixture through a stack;
- mixing the heated inert gas and the heated liquid metal;
- passing the mixture of heated inert gas and heated liquid metal through a second MHD generator to generate electrical energy;
- separating the liquid metal and the inert gas;
- returning the separated liquid metal to the liquid metal-gas heat exchanger;
- passing the separated inert gas through a gas turbine to recover mechanical energy;
- passing the effluent inert gas from the gas turbine through a regenerator;
- removing heat from the effluent inert gas in a reject heat exchanger;
- compressing the inert gas in a compressor;
- returning the compressed inert gas through the regenerator to and through the walls of the combustion chamber and first MHD generator;
- recycling to the step of mixing inert gas with liquid metal;
- passing the heated working fluid from the boiler through a turbine to recover mechanical energy;
- cooling the heated working fluid leaving the turbine in a condenser; and
- pumping the cooled working fluid to return the cooled working fluid under pressure to the boiler.

* * * * *